Patented Feb. 9, 1937

2,069,906

UNITED STATES PATENT OFFICE 2,069,906

WELDING ROD

Eugen Vaders, Frankfort-on-the-Main, Germany

No Drawing. Application July 27, 1935, Serial No. 33,556. In Germany April 17, 1935

10 Claims. (Cl. 219—8)

The invention relates to a welding rod for gas welding of copper and copper alloys, by which much stronger and tougher joints can be obtained than by all the other welding materials known till now.

As welding rods for the welding of copper, copper alloys with various additions are in use. These additions depend on the requirements in regard to the working up of the welding rod and the reliability of the weld. A good working up of the welding rod is easily obtained by the application of such copper alloys, which contain suitable deoxidizing agents such as phosphorus, silicon, lithium, manganese etc. In this combination the manganese and the silicon may also be added with the aim of increasing the tensile strength of the weld. Similar acting additions are furthermore nickel, cobalt, tin, zinc, aluminium and especially precious metals such as silver and gold. These two metals as additions to a welding rod in combination with a deoxidizing agent are believed to have particularly favourable influence on the quality of the welded joint. Some of these additions e. g. the silicon, the aluminium and the zinc give, as it is known, better welds regarding the tensile strength, but they have a detrimental effect on the fluidity and cause absorption of gases and porosity. In consequence such welding rods are not satisfactory. It seems that hitherto it has been very difficult to compose a welding alloy, which not only has an easy flow but by the use of which it was also possible to obtain welds of good mechanical properties.

I have now discovered, that by using welding rods, which besides copper, contain antimony and a deoxidizing agent welds of an extraordinary tensile strength are obtained. As a deoxidizer I add either phosphorus or manganese or lithium, or silicon alone or in a suitable combination; furthermore the welding alloy may contain small amounts of nickel, cobalt manganese, tin and arsenic. By these additional metals, which are used individually or in combination, the strength and the elongation of the welds are further increased.

The contents of antimony and also of the above mentioned additional metals are between 0.10 and 2%, those of the deoxidizers between 0.01 and 1.5%.

How much the welds made by the use of the new rod are superior to those which are obtained by the best conventional copper welding rods hitherto used, can be best seen from a comparison of the strength of the welds.

In the "Technische Zeitschrift für praktische Metallbearbeitung" of May 25, 1935, page 149 and in "Der Apparatebau" No. 9, 1935, page 92, two articles of different authors deal with the copper welding. Both authors come to the conclusion, that the unhammered copper welding-test has a tensile strength of not more than 11–12 kg./qmm., an elongation of about 5–7% and a bending angle of about 90°. I, on the contrary, have found, that my new welding rod gives mechanical values surpassing the above mentioned by more than 50% to 100%.

The following tables show the values which are obtained by using various copper-welding rods which are regarded to be the best that actually exist. The tensile strength of all tests does not exceed 11.5–12 kg./qmm. and only the test made with the new rod has furnished a strength of 18 kg./qmm. This value has never been reached before.

All tests were made under exactly the same conditions. The welds were not hammered neither in the cold nor in the warm state, because the effect of hammering is too widely depending from the force applied. Hammering is doubtlessly a good means to strengthen a welded joint, but tests which serve for a comparison never ought to be hammered. Hammered or otherwise worked welding tests will never give exact values.

It is evident that my invention is of great importance in such cases where in practice hammering of the weld is not possible. The unhammered weld obtained by the use of my new rod is nearly as strong as others made of known rods but in the hammered condition. The welding rod flows very easily without forming any slags, blows or smoke. It can be used for horizontal welding as well as for over-head welding.

The manufacture of my improved welding rods has no difficulties. The alloys can be easily molten, rolled and drawn to wire.

Welding itself is best done by aid of a good welding powder.

Table 1

From the "Technische Zeitschrift für praktische Metallbearbeitung" of May 25, 1935, page 149.

| Welding rod | Treatment | Thickness of copper sheet | Tensile strength kg./qmm. | Elongation Percent | Bending angle |
|---|---|---|---|---|---|
| Electrolytic wire. | Unhammered planed. | 4 mm | 11,6 | 6,7 | 65,8 |
| Containing noble metals. | do | 4 mm | 11,8 | 5,8 | 89,5 |
| Special rod | do | 4 mm | 11,5 | 4,6 | 50 |
| Rod according to invention. | do | 4 mm | 18 | 10 | 160–180 |

Table 2
From "Der Apparatebau" No. 9, 1935, page 92.

| Welding rod | Treatment | Thickness of copper sheet | Tensile strength |
|---|---|---|---|
| new special rod of other provenance. | Unhammered planed. | 4 mm | (1.) 11,9 kg./qmm. (2.) 11,8 kg./qmm. (3.) 11,3 kg./qmm. |

What I claim is:

1. As a new article of manufacture, a welding rod constituted of at least 95% of copper, about 0.01% to about 2% of antimony, about 0.01% to about 1.5% of a deoxidizing agent, and an addition agent containing at least one element of the group consisting of nickel, cobalt, manganese, tin and arsenic constituting the rest.

2. As a new article of manufacture, a welding rod constituted of at least 95% of copper, about 0.01% to about 2% of antimony, about 0.01% to about 1.5% of a deoxidizing agent containing at least one element of the group consisting of phosphorus, manganese, lithium and silicon, and an addition agent containing at least one element of the group consisting of nickel, cobalt, manganese, tin and arsenic constituting the rest.

3. As a new article of manufacture, a welding rod constituted of at least 95% of copper, about 0.01% to about 2% of animony, and about 0.01% to about 1.5% of phosphorus.

4. As a new article of manufacture, a welding rod constituted of at least 95% of copper, about 0.01% to about 2% of antimony, about 0.01% to about 2% of arsenic, and about 0.01% to about 1.5% of phosphorus.

5. As a new article of manufacture, a welding rod constituted of at least 95% of copper, about 0.01% to about 2% of antimony, about 0.01% to about 2% of arsenic, about 0.01% to about 1.5% of phosphorus, and about 0.01% to about 2% of nickel.

6. As a new article of manufacture, a welding rod constituted of at least 95% of copper, about 0.01% to about 2% of antimony, about 0.01% to about 2% of arsenic, about 0.01% to about 1.5% of phosphorus, and about 0.01% to about 2% of cobalt.

7. As a new article of manufacture, a welding rod constituted of at least 95% of copper, about 0.01% to about 2% of antimony, about 0.01% to about 2% of arsenic, about 0.01% to about 1.5% of phosphorus, and about 0.01% to about 2% of manganese.

8. As a new article of manufacture, a welding rod constituted of at least 95% of copper, the balance being substantially constituted of antimony.

9. As a new article of manufacture, a welding rod constituted of at least 95% of copper, about 0.01% to about 2% of antimony, and a deoxidizing agent constituting the rest.

10. As a new article of manufacture, a welding rod constituted of at least 95% of copper, about 0.01% to about 2% of antimony, and about 0.01% to about 1.5% of a deoxidizing agent.

EUGEN VADERS.